(12) United States Patent
Zak et al.

(10) Patent No.: US 7,120,858 B2
(45) Date of Patent: Oct. 10, 2006

(54) METHOD AND DEVICE FOR OFF-LOADING MESSAGE DIGEST CALCULATIONS

(75) Inventors: Robert C. Zak, Bolton, MA (US); Christopher J. Jackson, Westford, MA (US)

(73) Assignee: Sun Microsystems, Inc., Santa Clara, CA (US)

(*) Notice: Subject to any disclaimer, the term of this patent is extended or adjusted under 35 U.S.C. 154(b) by 447 days.

(21) Appl. No.: 10/224,898

(22) Filed: Aug. 21, 2002

(65) Prior Publication Data

US 2004/0039980 A1 Feb. 26, 2004

(51) Int. Cl.
*H03M 13/09* (2006.01)

(52) U.S. Cl. .................................. 714/807
(58) Field of Classification Search .............. 714/807
See application file for complete search history.

(56) References Cited

U.S. PATENT DOCUMENTS

| | | | | |
|---|---|---|---|---|
| 4,188,665 A | * | 2/1980 | Nagel et al. | 710/45 |
| 5,430,842 A | * | 7/1995 | Thompson et al. | 709/236 |
| 5,537,417 A | * | 7/1996 | Sharma et al. | 709/250 |
| 5,710,908 A | * | 1/1998 | Man | 709/230 |
| 5,898,713 A | * | 4/1999 | Melzer et al. | 714/807 |
| 5,983,270 A | * | 11/1999 | Abraham et al. | 709/224 |
| 5,999,979 A | * | 12/1999 | Vellanki et al. | 709/232 |
| 6,038,609 A | * | 3/2000 | Geulen | 709/250 |
| 6,070,182 A | * | 5/2000 | Rao et al. | 708/708 |
| 6,172,990 B1 | * | 1/2001 | Deb et al. | 370/474 |
| 6,195,779 B1 | * | 2/2001 | Suzuki et al. | 714/758 |
| 6,260,168 B1 | * | 7/2001 | Godoroja | 714/752 |
| 6,289,023 B1 | * | 9/2001 | Dowling et al. | 370/419 |
| 6,310,884 B1 | * | 10/2001 | Odenwald, Jr. | 370/412 |
| 6,385,751 B1 | * | 5/2002 | Wolf | 714/784 |
| 6,415,413 B1 | * | 7/2002 | Pan et al. | 714/784 |
| 6,570,884 B1 | * | 5/2003 | Connery et al. | 370/419 |
| 6,577,678 B1 | * | 6/2003 | Scheuermann | 375/222 |
| 6,629,288 B1 | * | 9/2003 | Bernath et al. | 714/807 |
| 6,631,488 B1 | * | 10/2003 | Stambaugh et al. | 714/746 |
| 6,766,493 B1 | * | 7/2004 | Hoffman et al. | 714/785 |
| 6,772,334 B1 | | 8/2004 | Glawitsch | |
| 6,798,787 B1 | * | 9/2004 | Kikuchi et al. | 370/468 |
| 6,804,673 B1 | | 10/2004 | Sugahara et al. | |
| 6,804,741 B1 | | 10/2004 | Cowan | |
| 6,851,052 B1 | | 2/2005 | Graveman | |

(Continued)

OTHER PUBLICATIONS

InfiniBand™ Architecture Specification vol. 1 Release 1.0.a, Jun. 19, 2001, p. 124-136 and 141-194.

*Primary Examiner*—Stephen M. Baker
(74) *Attorney, Agent, or Firm*—Meyertons Hood Kivlin Kowert & Goetzel, P.C.; B Noël Kivlin (57) ABSTRACT

A method and device for off-loading from an application program the calculation of a data-integrity-checking value for specified data in a computer system. The data may be included in a message together with the integrity-checking value or may be in a portion of a memory window for direct memory access. The method includes communicating a selected data-integrity-checking scheme from a specified set of schemes to another processor to off-load calculation of the data-integrity-checking value. A related method associates a message to be received with a data-integrity-checking scheme, so that a receiving processor can calculate the data-integrity-checking value and transmit both the value and the message to another processor.

19 Claims, 7 Drawing Sheets

U.S. PATENT DOCUMENTS

| | | |
|---|---|---|
| 6,854,032 B1 | 2/2005 | Dearth et al. |
| 6,859,867 B1 | 2/2005 | Berry |
| 6,868,450 B1 * | 3/2005 | Lucovsky .................. 709/229 |
| 6,904,519 B1 * | 6/2005 | Anand et al. ................ 713/100 |
| 6,976,205 B1 * | 12/2005 | Ziai et al. .................... 714/807 |

* cited by examiner

METHOD AND DEVICE FOR OFF-LOADING
MESSAGE DIGEST CALCULATIONS

TECHNICAL FIELD

The present invention relates to integrity-checking calculations for data transfers among computer system nodes.

BACKGROUND OF THE INVENTION

A data digest is a data-integrity-checking value that is computed for a segment of digital data in a computer system. These digests (of which checksums are a special, common case) have proven useful for ensuring data integrity in transmission and storage of data. The digest is a mathematical function of the data, with the digest usually much smaller than the data segment to be protected. This data-integrity-checking value is often included with the original data when a message is transmitted or communicated, in space or time, to a data consumer. The consumer can compute the data digest for the data using the same digest scheme employed by the digest generator and then compare the value of the computed digest with the digest value received. If the two digest values match, then there is a high probability that the data was transmitted or stored without error. Note that as used in the description and any appended claims, the terms "digest" and "data-integrity-checking value" will have the same meaning.

Figure 1:
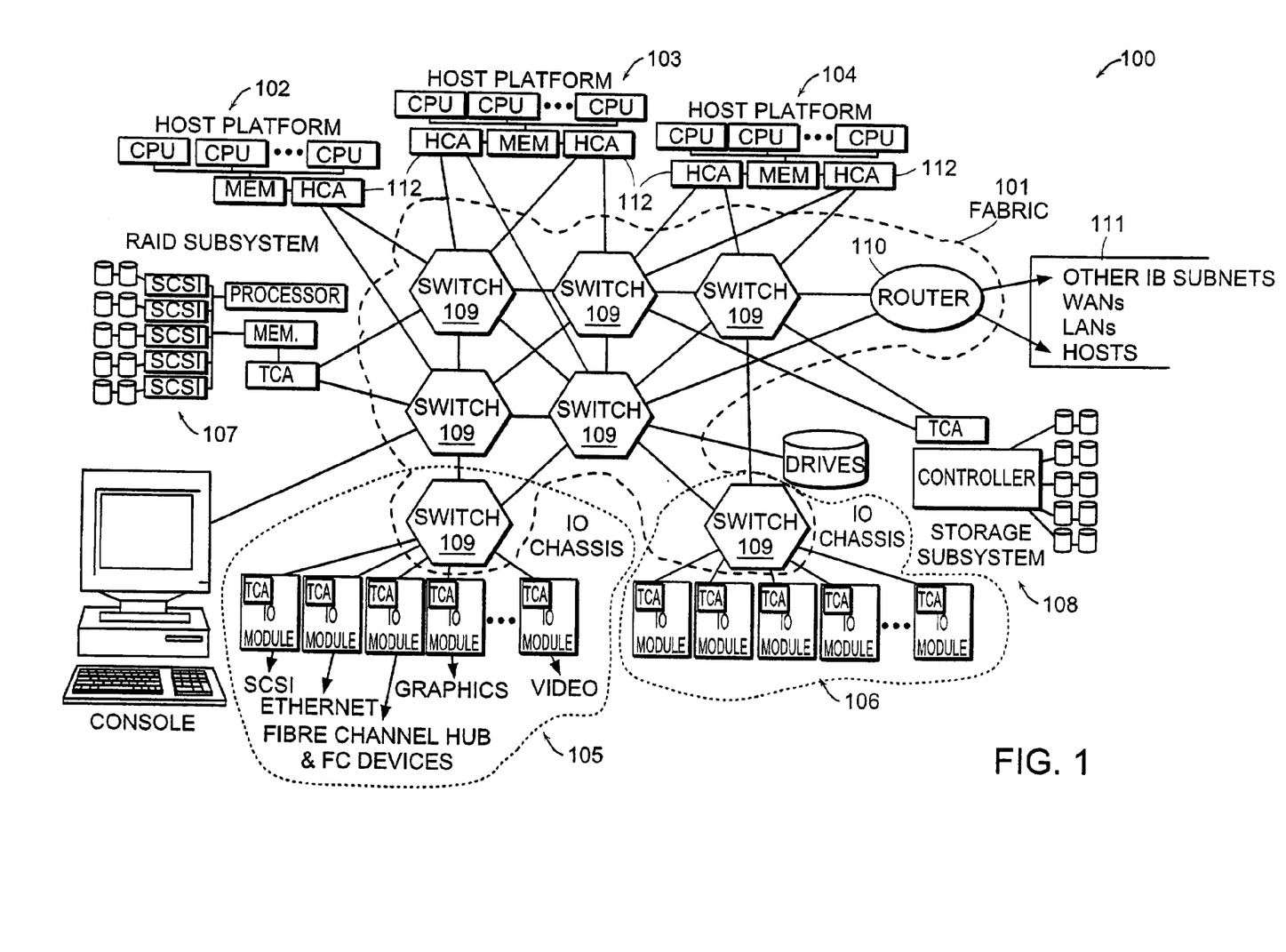
FIG. 1 shows a block diagram of a network of computer nodes according to the InfiniBand™ specification.

In today's networked computing environments, the number of processors often found between data producers and consumers continues to increase. These processors may not be under the control of either the producer or the consumers of the data. Further, either the producer or the consumers of data may not know the integrity with which each processor manipulates or communicates data. For example, a communication network may be implemented according to the InfiniBand™ Architecture Specification developed by the InfiniBand Trade Association$^{SM}$, the specification for which is incorporated herein by reference (InfiniBand™ Architecture Specification, version 1.0). The InfiniBand™ Architecture defines a system area network for connecting host processor nodes, input/output ("IO") platforms, and IO devices, as is shown in FIG. 1. System 100 is a communications and management infrastructure supporting both IO and interprocessor communications for one or more computer systems. The system 100 can range from a small server with one processor and a few IO devices to a massively parallel supercomputer installation with hundreds of processors and thousands of IO devices. Communication among nodes is accomplished according to an InfiniBand™ protocol. In addition, the IP (Internet protocol) friendly nature of the architecture allows bridging to an Internet, intranet, or connection to remote computer systems 111.

The InfiniBand™ architecture defines a switched communications fabric 101 allowing many devices to concurrently communicate with high bandwidth and low latency in a protected, remotely managed environment. The system 100 consists of processor nodes 102, 103, and 104 and IO units 105, 106, 107, and 108 connected through the fabric 101. The fabric is made up of cascaded switches 109 and routers 110. IO units can range in complexity from a single attached device, such as a SCSI or LAN adapter to large memory rich RAID subsystems 107. While some InfiniBand™ transfers among nodes may be protected using data digests, the integrity of intra-node programming may not be guaranteed. In fact, the path that data will travel between data producers and consumers may vary due to adaptive routing procedures and the like. Thus, a mechanism is needed to verify the end-to-end integrity of a data transfer from an application that produces or manipulates data to one or more applications that use the data.

SUMMARY OF THE INVENTION

In an embodiment of the invention, a method is provided for off-loading, from an application program, the calculation of a data-integrity-checking value for computer system data. The method includes selecting a data-integrity-checking scheme from a specified set of schemes using an application program; communicating the scheme and the data to a second program; calculating the data-integrity-checking value using the second program; and may include transmitting the value and the data to at least one other node. The second program may calculate the data integrity-checking value using special purpose hardware resources or by software means or by a combination of both techniques. This method provides a general interface for application programs to request calculation of data digests and, further, allows an application program to take advantage of special purpose hardware, when available, for calculating these digests.

In another embodiment of the invention, a method is provided for off-loading from an application program the calculation of a data-integrity-checking value for a received message. The method includes selecting a given data-integrity-checking scheme from a specified set of schemes using an application program; communicating the given data-integrity-checking scheme and a given message identifier to a second program; calculating the data-integrity-checking value according to the scheme for a received message, using the second program; and communicating the received message and the data-integrity-checking value to the application program. The second program may calculate the data integrity-checking value using special purpose hardware resources or by software means or by a combination of both techniques. Combining this embodiment of the invention with the preceding embodiment allows application programs to determine the "end-to-end" integrity of a data transfer.

In a further embodiment of the invention, a method is provided for off-loading calculation of a data-integrity-checking value for a memory window of a computer system for a remote direct memory access transfer. The method comprises selecting a data-integrity-checking scheme, using an application program, from a specified set of schemes including selecting an expected address range for the calculation; communicating the scheme to a second program; calculating the data-integrity-checking value according to the scheme over an address range specified by the application program after the transfer, using resources available to the second program; and communicating the data-integrity-checking value to the application program. In a specific embodiment of the invention, when the second program has access to special purpose hardware resources for the calculation, the method further includes initializing the hardware resources and a digest-valid flag. If the hardware is able to calculate the digest, the hardware sets the digest-valid flag to true and supplies the digest value and the address limits over which the calculation occurred to the second program. If the digest-valid-flag is true and the address limits for the calculation match the address range specified by the application program after the transfer, the second program retrieves the hardware-calculated digest value and forwards the value to the application program. Otherwise, the second program calculates the digest over the specified address range using software means and forwards the value to the application program.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Computer systems have employed various schemes to ensure data-integrity in networking and in data storage. Commonly used types of data digests include checksums (e.g., IP-16), cyclic redundancy checks ("CRC") (e.g., CRC-16, CRC-CCITT, CRC-32, CRC-64), hashing functions, and other functions such as parity and accumulated exclusive-or (e.g., xor-16). These digest types differ in the total number of bit errors in the data that can occur before the digest fails to report an error, the computational complexity in creating the digest and the length of the data-integrity-checking value that the digest type generates. The above-named data digest types are described for illustration, and not by way of limitation. Use of any data digest type known in the art together with data digest types that may be developed, is intended to be within the scope of the present invention. Commonly used data-integrity-checking digest types are described in Larry L. Peterson and Bruce S. Davie, *Computer Networks: A Systems Approach*, pages 92–103, (2d ed., 2000), which is incorporated herein by reference in its entirety.

As used in this specification and in any appended claims, unless context requires otherwise, description of a data-integrity-checking scheme for messages includes specifying the data digest type (e.g., IP-16, CRC-CCITT, etc), the starting place in the data and the ending place in the data over which the digest is calculated and the position in the data message at which the calculated digest will be or was inserted, if the digest is contained within the message. If any of the latter three parameters are not identified, default values for these parameters may be used in the calculation.

In an embodiment of the present invention, a method is provided for off-loading, from an application program, calculation of a data-integrity-checking value for a data message. The method includes selecting a data-integrity-checking scheme from a specified set of schemes. An application program identifies the scheme and then communicates the data message and the integrity-checking scheme to a second program. The second program then calculates the data-integrity-checking value according to the scheme and then transmits the message to at least one receiving node. The message may include the data-integrity-checking value. The second program may compute the data-integrity-checking value entirely by software means or may employ a combination of software and special-purpose hardware components to speed computation. This approach advantageously allows, for example, an application program to off-load digest computation to another program, which may have access to superior resources to calculate the digest. Further, an application program may use a generalized interface to request data-integrity-checking value calculations, which interface does not depend on the capabilities of the processing element(s) that will perform the calculations. Thus, implementation of data integrity-checking at the application program level can be facilitated.

Figure 2:
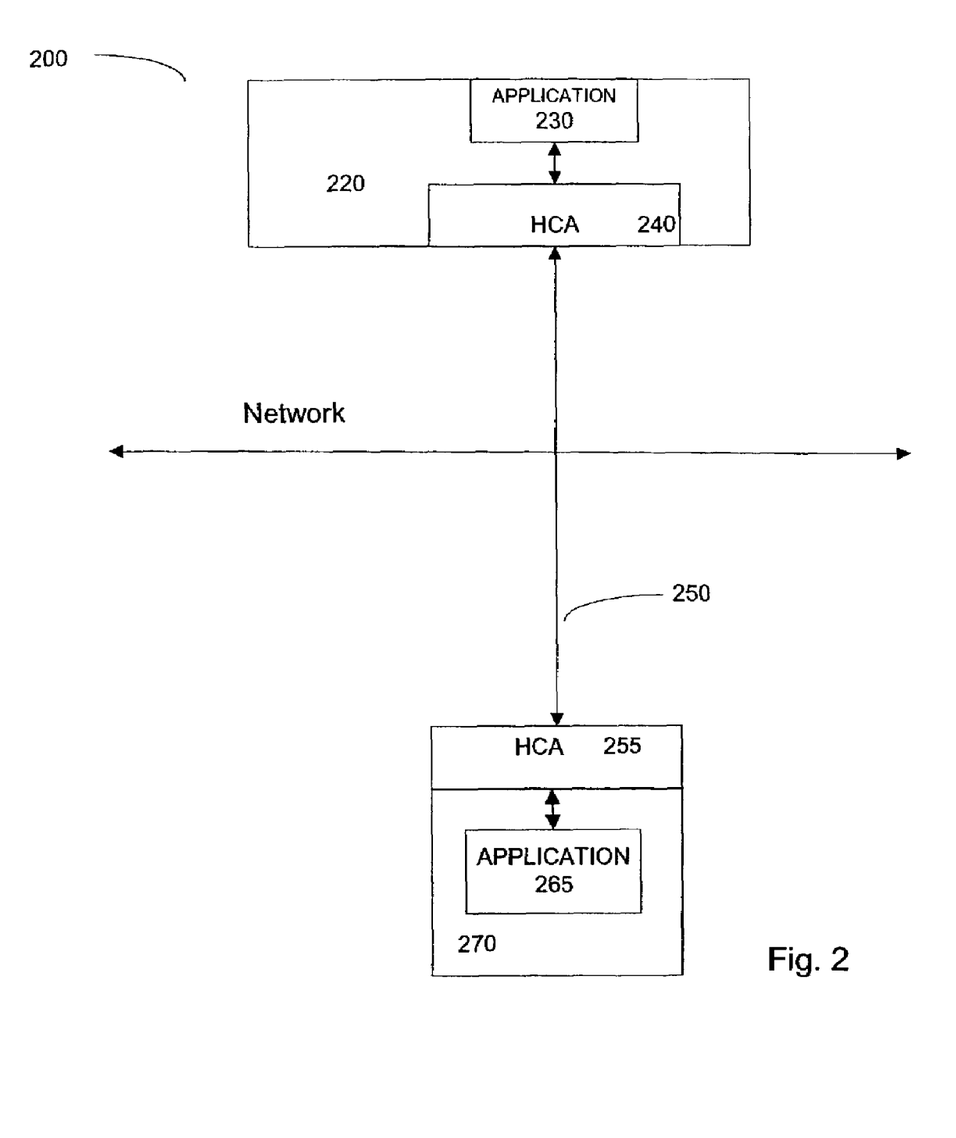
FIG. 2 shows a portion of an InfiniBand™ network according to an embodiment of the invention.
Figure 3:
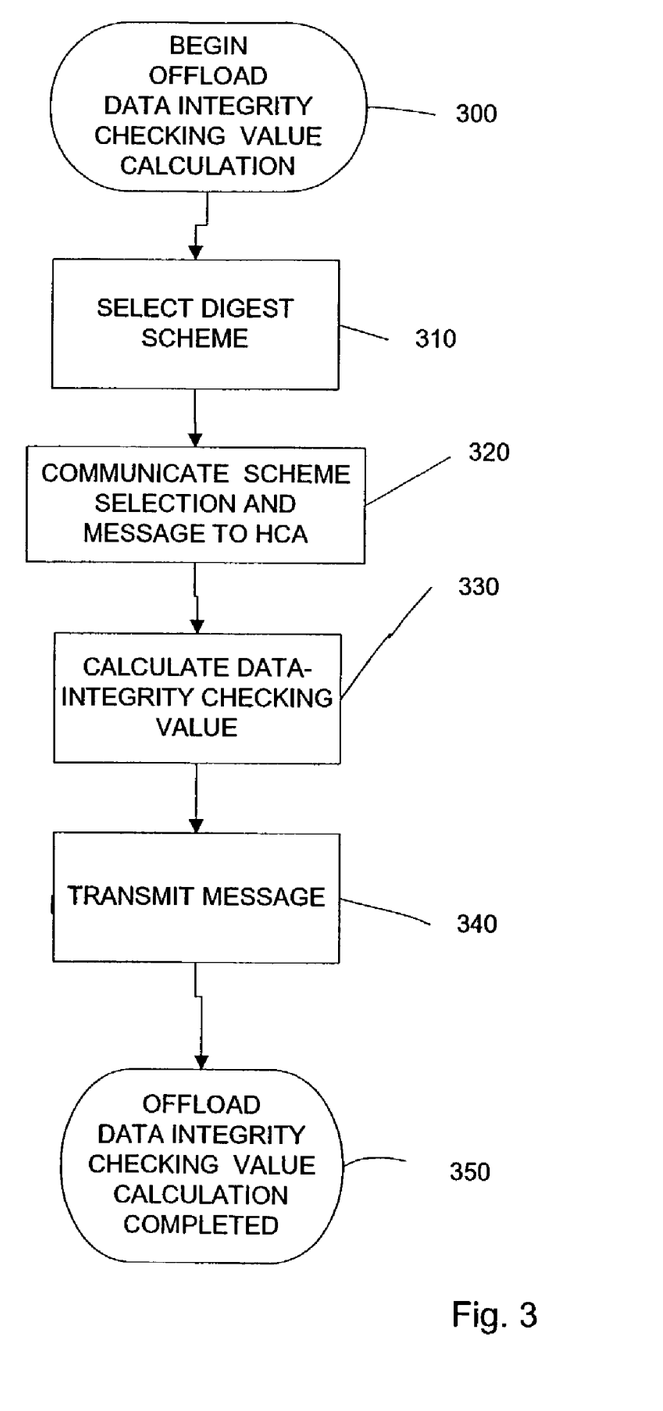
FIG. 3 shows a flow diagram for off-loading calculation of a digest for message transmission according to an embodiment of the invention.

This embodiment of the invention is illustrated in the flow diagram in FIG. 3, while FIG. 2 shows a simplified block diagram of a portion 200 of an InfiniBand™ network that includes message sending system 220 and message receiving system 270. The sending system and the receiving system communicate over the network 250. System 220 includes application program 230 and host channel adapter ("HCA") 240, while system 270 includes application program 265 and HCA 255.

Referring to FIG. 3, application program 230 of system 220 selects 310 the digest scheme that will be employed for a specified message. The data-integrity-checking scheme is selected from a specified set of digest schemes. The selected scheme together with the message data are communicated 320 to HCA 240. The communication of the selected scheme includes identifying the type of digest, the starting place in the data for the calculation, the ending place in the data and may include identifying a starting place in the message in which to insert the digest. HCA 240 calculates 330 the data-integrity-checking value and may communicate the calculated data-integrity-checking value to the application program 230. HCA 240 may take advantage of any special purpose hardware available to accelerate the digest calculation or may calculate the digest through software means or a combination of these techniques. The message is then transmitted 340 by the HCA 240 to system 270. The message may contain the digest or the digest may be transmitted separately.

Figure 4:
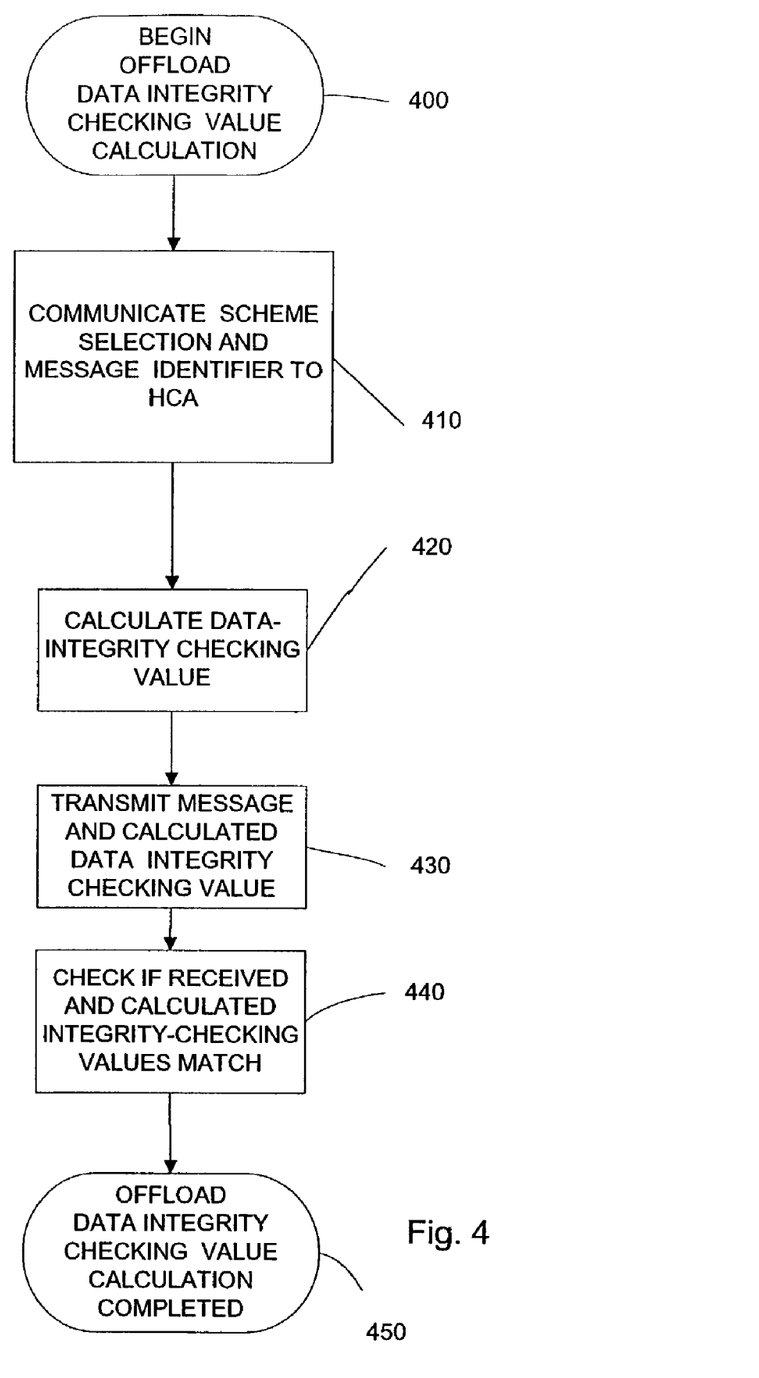
FIG. 4 shows a flow diagram for off-loading calculation of a digest for a received message according to an embodiment of the invention.

FIG. 4 illustrates a method 400 of off-loading digest calculation from an application program for a received message according to an embodiment of the invention. An application program 265 of system 270 communicates 410 a data-integrity-checking scheme selection and message selection criteria to the HCA 255. The scheme is selected from a specified set of schemes. The communication of the selected scheme includes identifying the type of digest, the starting place in the data for the calculation, the ending place in the data for the calculation and may identify a starting place in the message in which the digest was inserted. Upon receipt of a message which meets the given message selection criteria, the HCA 255 calculates 420 the data-integrity-checking value according to the selected scheme. The HCA transmits 430 the message and the calculated checking value to the application program. The application program 265 then may check 440 whether the calculated checking value matches the checking value contained in the message or received by another means. Note that the HCA 255 need not check the computed digest against the received data digest nor is the application program required to take any action based on the value of the calculated and the received data-integrity-checking values. HCA 255 may also perform message data-integrity-checking, as required by, for example, a transport level protocol. Off-loading of digest calculation is then complete 450. This embodiment of the invention advantageously allows an application program to determine end-to-end integrity of data sent by another application program running on another node. The application program need not be concerned with the details of calculating the digest and special purpose hardware may be employed to speed the digest calculation.

The diagram of FIG. 2 has been used for purposes of illustration and not for limitation of the scope of the invention. The communication network may include any means of transmitting data among computer systems or portions of computer systems. The resources for calculating the data-integrity-checking value may be any resource, software or hardware, capable of calculating such digests of which a program running as part of an InfiniBand™ HCA is only an example. Calculation of digests may be done entirely in hardware or in software or in any combination of the two techniques. The program that calculates the digest for sending or receiving a message may run on a separate processor or run on the processor that executes the application program that sources, uses or receives the data. The means for communicating the data message and selected digest scheme to the program for the calculation of the digest may be any technique known in the art, including without limitation, providing application program interface extensions that communicate such information. The architecture of the computer system may be a layered architecture and communication of the data message and the data-integrity-checking scheme may include communicating from a higher architectural layer, such as the application layer, to a lower layer, such as a transport layer.

In another embodiment of the present invention, a method is provided for off-loading from an application program, data-integrity-checking value calculations for a memory window of a computer system. A "memory window" as used in this specification and in any appended claims unless context requires otherwise, will mean a resource that provides remote access to a particular area of a computer memory. A memory window may be used, for example, for remote direct memory access ("RDMA") transfers.

The method includes selecting a data-integrity-checking scheme from a specified set of schemes using an application program. Specification of a complete integrity-checking scheme for this embodiment of the invention includes describing the type of digest to be calculated, the offset in bytes from the base address of the memory window at which to start digest calculation and the length of the memory area from the offset over which to calculate the digest. An application program, to which the memory window is local, selects the scheme and then communicates the scheme to a second program. Subsequent to a transfer to or from the memory window, when queried by the application program, the second program transmits the value of the digest calculated over the identified portion of the memory window to the application program. The query by the application program may include different address limits over which the second program is to calculate the digest, than were communicated initially by the application program. This approach advantageously allows the first program to off-load digest computation to the second program. The second program may employ special purpose hardware components, if available, to speed digest computation. Further, this approach may advantageously reduce the number of times the data is "touched" by a program to one, since the data may be transferred and the digest may be calculated concurrently. The application program may transmit the data-integrity-checking value to a second application program running on a remote system, including the system that transferred data to the memory window. This second application program can then compare the digest with the data transferred to the region of the memory window to determine the integrity of the transfer.

In a further embodiment of the invention for off-loading calculation of digests for RDMA transfers to memory windows, the second program may employ hardware resources to accelerate calculation of digests on RDMA transfers to the remote window. In the general case of RDMA transfers, a specific hardware resource may not be able to calculate the data-integrity-checking value. For example, if hardware resources are provided to calculate the value in the simple case that transfers proceed in a single transfer from the start to the end of the region identified in the integrity-checking scheme, the digest for RDMA transfers that do not follow that paradigm must be calculated in software. A transfer may include one or more of the following conditions that complicates the digest calculation beyond the capability of a hardware resource to calculate the digest, if the hardware is implemented to handle only the above "simple case":

the transfer only covers part of the identified memory window;

the data is not transferred in order;

the hardware resource is busy calculating a digest for another window;

the hardware resource is unavailable, e.g., has not yet been set up; or the hardware resource is incapable of calculating a digest for the particular digest type, e.g., a hashing function.

If the hardware resource is unable to calculate the digest, the hardware signals the second program, which will calculate the digest using software means and report the calculated digest to the application program. Otherwise, the second program will forward the digest calculated by the hardware resource.

Figure 5:
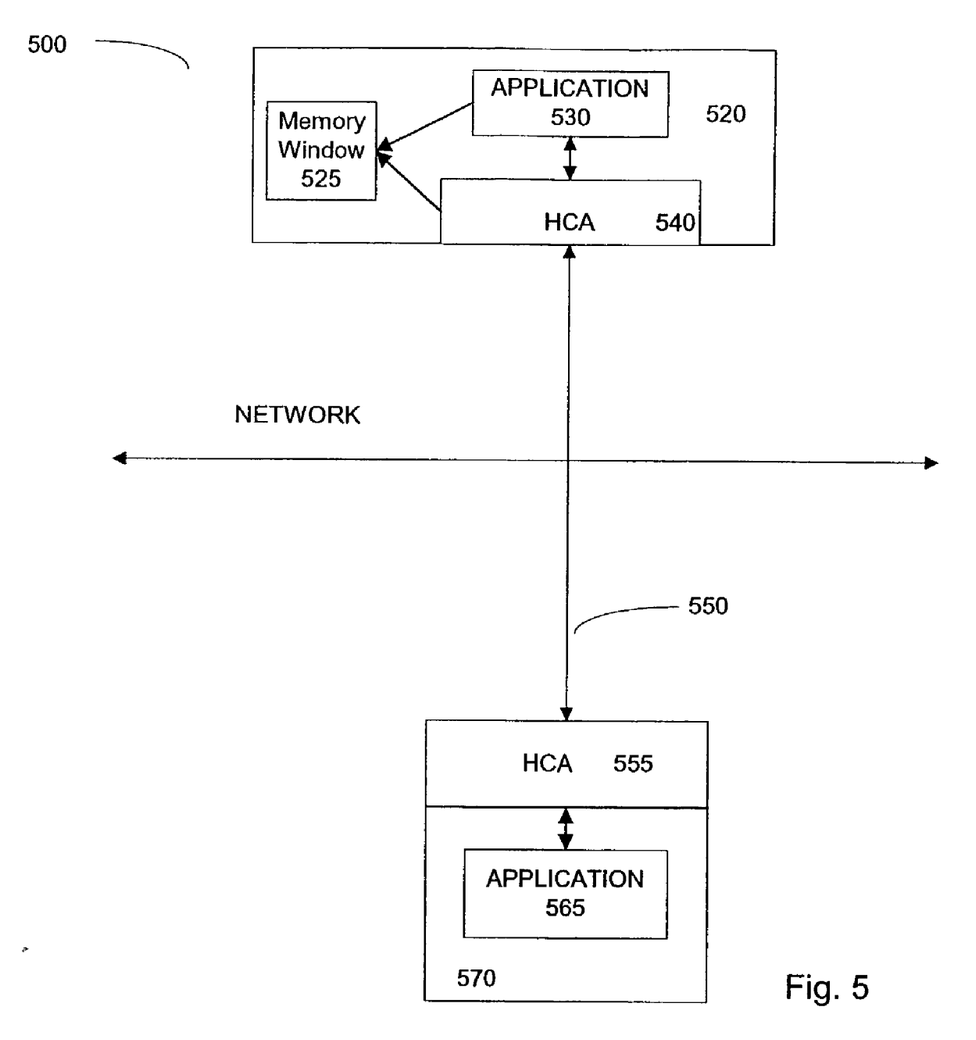
FIG. 5 shows a portion of an InfiniBand™ network according to an embodiment of the invention.
Figure 6:
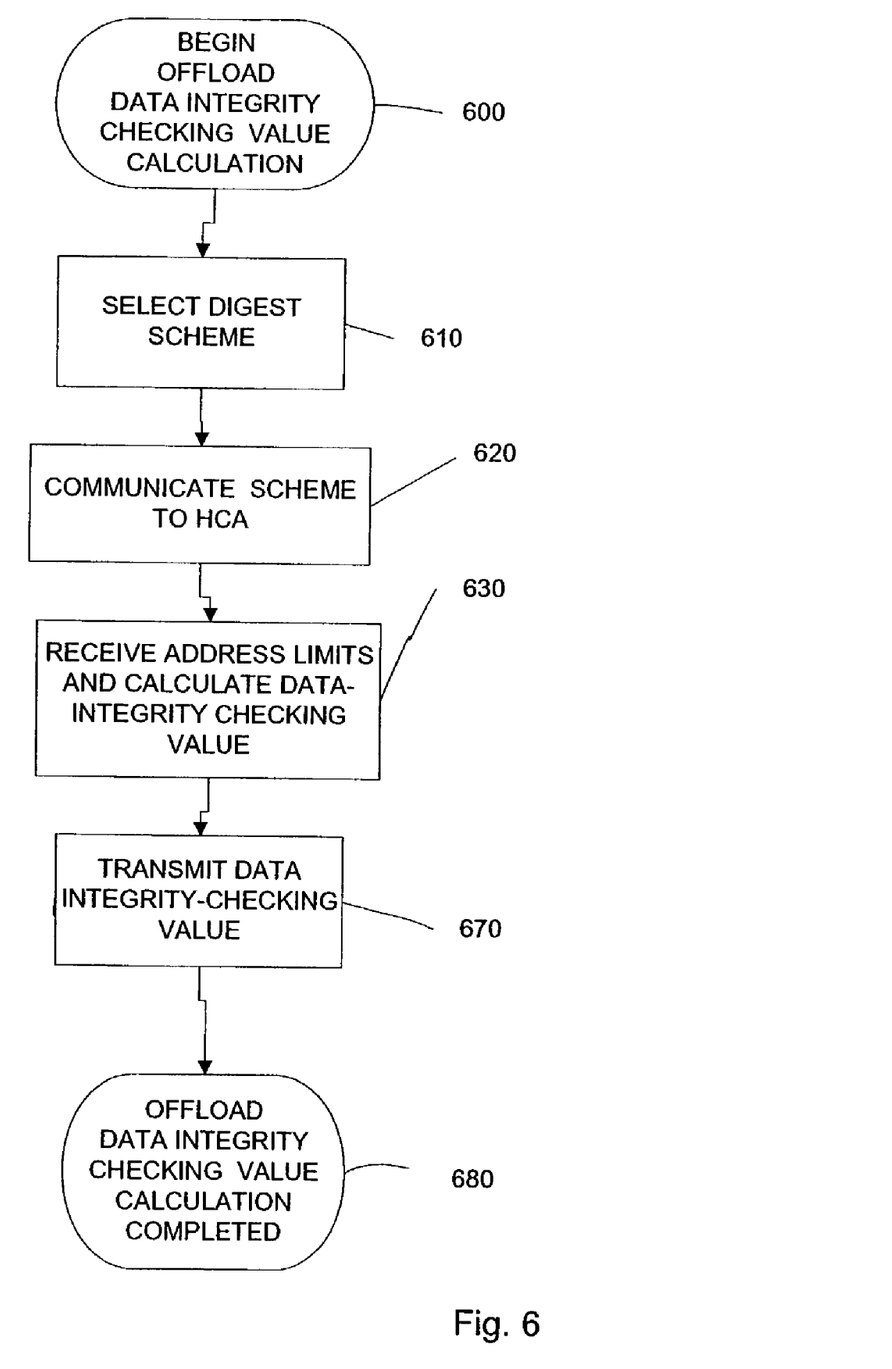
FIG. 6 shows a flow diagram for off-loading digest calculation for a direct memory access transfer.

A method 600 is illustrated by FIG. 6 for off-loading digest calculation for a memory window according to this embodiment of the invention. FIG. 5 shows a simplified diagram of a portion 500 of an InfiniBand™ network used by this method. The portion 500 includes a first computer system 520 with a memory window 525 and a remote system 570 according to an embodiment of the invention. Remote system 570 has access to memory window 525 for data reads and/or writes. System 520 and the remote node 570 communicate over the network 550. Node 520 includes HCA 540 while node 570 includes HCA 555.

Referring to FIG. 6, application program 530 of node 520 selects 610 the digest scheme to be employed for checking the integrity of data in memory window 525 from a specified set of digest schemes. The selected scheme is communicated 620 to the HCA 540. The communication of the scheme includes identifying the start and end of the portion of the memory region within the window, which is expected to be included in the data-integrity-checking value calculation, and the data-integrity-checking value type. The expected bounds of the transfer are supplied as a "hint" for hardware components that can accelerate the calculation, if available. In a specific embodiment of the invention, this communication is effected by a bind memory window operation. When a transfer has been made to the memory window, the desired portion of the memory window over which to calculate the digest is communicated to the HCA 540 630, digest calculations are performed accordingly, if needed, and the HCA then communicates 670 the data-integrity-checking value to the application program 530. In a specific embodiment of the invention, identifying the desired portion of the memory window over which to calculate the digest after the transfer and communicating the data-integrity-checking value is initiated by the application program using a query memory window operation. The method is then complete 680.

Figure 7:
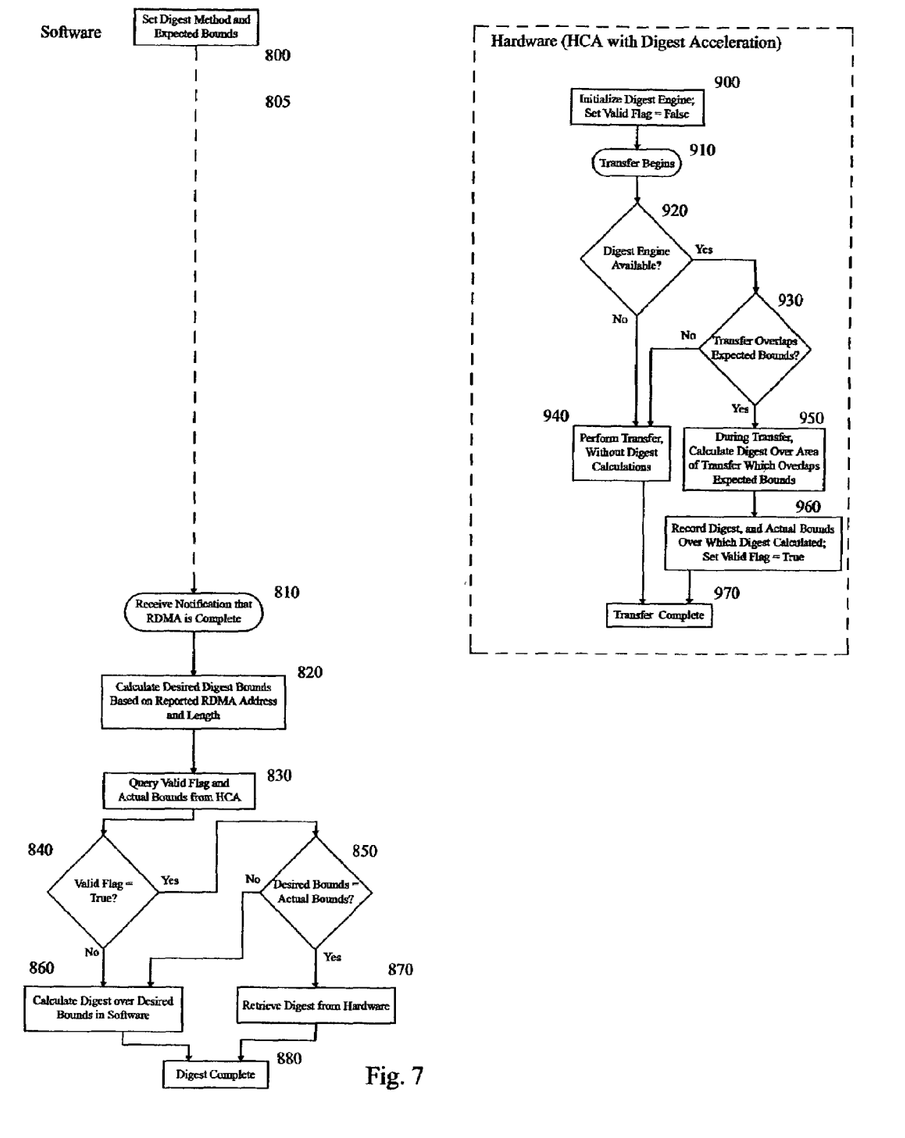
FIG. 7 shows a flow diagram for software processing for off-loading digest calculation for a direct memory access transfer using hardware resources to facilitate the calculation.

In a further specific embodiment according to the preceding embodiment, the HCA includes a digest program that calculates the data-integrity-checking value together with hardware resources that can accelerate the calculation. As shown in FIG. 5 and FIG. 7, application program 530 of node 520 selects 800 the digest scheme from a specified set of digest schemes to be employed for checking the integrity of data in memory window 525. The application also indicates the expected bounds of the transfer as a hint to the hardware. The selected scheme is communicated 805 to the HCA 540 by the application program 530. The digest program then waits for external notification that the RDMA has completed 810.

After being notified of the digest scheme from software 805, the HCA sets the digest-valid flag to false and initializes 900 the hardware resources to calculate the digest. When the RDMA transfer starts 910, if a hardware digest engine is available 920, and if the RDMA transfer overlaps the expected bounds 930, then hardware resources are invoked to calculate the digest over the area of transfer which overlaps the expected address bounds 950. At the completion of the RDMA transfer, the hardware records the digest calculated, the actual bounds over which the digest was calculated, and sets the digest-valid flag to TRUE 960. If no digest engine is available, or if the transfer does not overlap the expected bounds, or the digest engine is unable to calculate a digest for some other reason as described previously, the transfer is performed without hardware assist 940 for digest calculation. The transfer completes, from a hardware perspective at 970.

When the digest program receives notification that the RDMA operation is complete 810, it calculates the desired digest address bounds based on the application reported RDMA address and length 820. Note that the desired digest bounds may be different from both the expected digest bounds 800, i.e., the "hint" provided to the hardware, and the actual bounds over which the digest was calculated in 960. The digest program then queries the values of the digest-valid flag and actual digest bounds from the HCA 830. If the digest-valid flag is TRUE 840 and the desired bounds identified by the application program match the actual bounds calculated by the hardware 850, then the digest program retrieves the digest value calculated by the hardware 870. If the digest-valid flag is FALSE, or the desired bounds do not match the actual bounds, then the digest program calculates the digest over the desired bounds 860. The digest calculation completes, with either a software or hardware calculated digest value at 880.

The diagram of FIG. 5 has been used for purposes of illustration and not for limitation of the scope of the invention. The communication network may be any means of transmitting data among computer systems. The node for calculating the data-integrity-checking value may be any node capable of calculating data-integrity-checking values of which an HCA is only one example. Such nodes may include general-purpose processors and need not be the same programming elements as the elements that receive the data from the network. The application program may run on any programming element or node within the computer system. The means for communicating the digest scheme to the program for the calculation may be any technique known in the art, including without limitation, providing application program interface extensions by which an application program communicates such information.

In another embodiment of the invention, a device is provided for off-loading calculation of a data-integrity-checking value for a data message. The device comprises a first processor that includes logic for selecting a data-integrity-checking scheme from a specified set of schemes using an application program; and logic for communicating the data-integrity-checking scheme and the message to a second processor. The second processor includes logic for calculating a data-integrity-checking value according to the scheme for the data message using the second program; and logic for transmitting the data-integrity-checking value.

In another embodiment of the invention, a device is provided for off-loading calculation of a data-integrity-checking value for a received message. The device comprises: a first processor including logic for selecting a data-integrity-checking scheme from a specified set of schemes, the logic executed by an application program; and logic for communicating the data-integrity-checking scheme and the message identifier to a second processor. The second processor includes logic for calculating the data-integrity-checking value according to the data-integrity-checking scheme for the message, the logic executed by a second program; and logic for communicating the given message and the data-integrity-checking value to the first processor.

In another embodiment of the invention, a device is provided for off-loading calculation of a data-integrity-checking value for a specified portion of a memory window for a direct memory access transfer. The device comprises a first processor that includes logic for selecting a data-integrity-checking scheme from a specified set of schemes, the logic executed by an application program, logic for communicating the data-integrity-checking scheme including expected address limits to a second processor, and logic for communicating address limits of the specified portion of the memory window after the transfer completes. A second processor is provided that includes logic for receiving the scheme from the first processor, receiving the address limits of the specified portion of the address window after the transfer completes and calculating a data-integrity-checking value according to the scheme for the specified portion of the window, when the direct memory access transfer completes, the logic executed by a second program; and logic for communicating the data-integrity-checking value to the first processor.

In a specific embodiment of the invention, according to the preceding embodiment, the logic for calculating a data-integrity-checking value includes: logic for initializing a hardware resource for calculating the value and setting a data-integrity-checking value valid flag to false; logic for calculating a data-integrity-checking value according to the scheme using the resource when the transfer occurs to expected address limits in the window; logic for setting the data-integrity-checking value valid flag to true and setting actual-transfer address-values, when the hardware resource completes the data integrity-checking value calculation; logic for reading the data-integrity-checking value valid flag and actual transfer address values using the second program when the application program queries the second program for the data-integrity-checking value, the query including the address limits of the specified portion of the memory window; and logic for calculating the data-integrity-checking value over the specified portion of the memory window using the second program when at least one of the following conditions is true: (1) the data-integrity-checking value valid flag is false and (2) the actual portion over which the digest was calculated by the hardware resource does not match the specified portion of the memory window.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

The described embodiments of the invention are intended to be exemplary and numerous variations and modifications will be apparent to those skilled in the art. All such variations and modifications are intended to be within the scope of the present invention as defined in the appended claims.

What is claimed is:

1. A method for off-loading calculation of a data-integrity-checking value for a data message, the method comprising:
   providing a generalized interface allowing application programs to request data-integrity-checking value calculations, wherein the interface is independent of the capabilities of the processing elements that perform the calculations;
   an application program selecting a data-integrity-checking scheme from a specified set of schemes, wherein each scheme of the specified set of schemes identifies a corresponding data digest type to calculate a data-integrity-checking value;
   the application program communicating the data-integrity-checking scheme and the data message to a second program using the generalized interface; and
   the second program calculating a data-integrity-checking value according to the data-integrity-checking scheme for the data message.

2. A method according to claim 1 wherein the specified set of schemes includes at least one scheme that employs a cyclic redundancy check and one scheme that employs a checksum.

3. A method according to claim 1, wherein the specified set of schemes includes at least two schemes, the schemes differing in at least one of a starting place in the message to start computing the data-checking value, a stopping place in the message to stop computing the data-checking value, and a position in the message at which to insert the data-checking value.

4. A method according to claim 1 wherein the second program runs on a host channel adapter.

5. A method according to claim 1 further including:
   the second program transmitting the data-integrity-checking value.

6. A method according to claim 5 wherein transmitting the data-integrity-checking value includes transmitting the value to a remote computer system.

7. A method for off-loading calculation of a data-integrity-checking value for a message received at a computer node, the method comprising:
   selecting a data-integrity-checking scheme from a specified set of schemes using an application program;
   communicating the data-integrity-checking scheme and a message selection criterion to a second program; and
   if the message meets the message selection criterion,
      calculating a data-integrity-checking value according to the data-integrity-checking scheme for the message using the second program; and communicating the message and the data-integrity-checking value to the application program.

8. A method according to claim 7 wherein the specified set of schemes includes at least one scheme that employs a cyclic redundancy check and one scheme that employs a checksum.

9. A method according to claim 7, wherein the specified set of schemes includes at least two schemes, the schemes differing' in at least one of a starting place in the message to start computing the data-checking value, a stopping place in the message to stop computing the data-checking value, and a position in the message at which to insert the data-checking value.

10. A method according to claim 7 wherein the second program runs on a host channel adapter.

11. A method for off-loading calculation of a data-integrity-checking value for a remote direct memory access (RDMA) transfer to a specified portion of a memory window, the method comprising:
   selecting a data-integrity-checking scheme from a specified set of schemes using an application program;
   communicating the data-integrity-checking scheme to a second program, including expected address limits;
   communicating address limits of the specified portion of the memory window to the second program after the transfer completes;
   calculating the data-integrity-checking value according to the given data-integrity-checking scheme for the specified portion of the memory window using the second program, when the remote direct memory access (RDMA) transfer occurs; and
   communicating the data-integrity-checking value to the application program.

12. A method according to claim 11 wherein calculating a data-integrity-checking value and communicating the data-integrity-checking value are performed by a host channel adapter.

13. A method for off-loading calculation of a data-integrity-checking value for a direct memory access transfer to a specified portion of a memory window, the method comprising:
   selecting a data-integrity-checking scheme from a specified set of schemes using an application program;
   communicating the data-integrity-checking scheme to a second program, including expected address limits;
   communicating address limits of the specified portion of the memory window to the second program after the transfer completes;
   calculating the data-integrity-checking value according to the given data-integrity-checking scheme for the specified portion of the memory window using the second program when the direct memory access transfer occurs; and
   communicating the data-integrity-checking value to the application program;
   wherein calculating the data-integrity-checking value using the second program includes:
      initializing a hardware resource for calculating the value and setting a data-integrity-checking value valid flag to false;
      calculating a data-integrity-checking value according to the scheme using the resource when the transfer occurs to expected address limits in the window;
      setting the data-integrity-checking value valid flag to true and setting actual-transfer address-values, when the hardware resource completes the data integrity-checking value calculation;
      reading the data-integrity-checking value valid flag and actual-transfer address-values using the second program when the application program queries the second program for the data-integrity-checking value, the query including the address limits of the specified portion of the memory window; and
      calculating the data-integrity-checking value over the specified portion of the memory window using the second program when at least one of the following conditions is true: (1) the data-integrity-checking value valid flag is false and (2) actual-transfer address-values do not match the specified portion of the memory window.

14. A method for off-loading calculation of a data-integrity-checking value for a direct memory access transfer to a specified portion of a memory window, the method comprising:
   selecting a data-integrity-checking scheme from a specified set of schemes using an application program;
   communicating the data-integrity-checking scheme to a second program, including expected address limits;
   communicating address limits of the specified portion of the memory window to the second program after the transfer completes;
   calculating the data-integrity-checking value according to the given data-integrity-checking scheme for the specified portion of the memory window using the second program when the direct memory access transfer occurs; and
   communicating the data-integrity-checking value to the application program;
   wherein communicating the scheme is performed by a bind memory window operation and wherein the data-integrity-checking value is accessible to the application program by a query memory window operation.

15. A device for off-loading calculation of a data-integrity-checking value for a data message, the device comprising:
   a first processor including:
      logic for selecting a data-integrity-checking scheme from a specified set of schemes using an application program, wherein each scheme of the specified set of schemes identifies a corresponding data digest type to calculate a data-integrity-checking value; and
      logic for communicating the data-integrity-checking scheme and the message; and
   a second processor including:
      logic for receiving the scheme and the data message from the first processor and calculating a data-integrity-checking value according to the scheme for the data message using a second program.

16. A device according to claim 15, wherein the second processor further includes:
   logic for transmitting the data-integrity-checking value.

17. A device for off-loading calculation of a data-integrity-checking value for a message, the message received at a computer system, the device comprising:
   a first processor including:
      logic for selecting a data-integrity-checking scheme from a specified set of schemes, the logic executed by an application program, and
      logic for communicating the data-integrity-checking scheme and an identifier for the message; and
   a second processor including:
      logic for receiving the scheme and the message identifier from the first processor and calculating the data-integrity-checking value according to the dataintegrity-checking scheme for the message, the logic executed by a second program, and logic for communicating the given message and the data-integrity-checking value to the first processor.

18. A device for off-loading calculation of a data-integrity-checking value for a direct memory access transfer to a specified portion of a memory window, the device comprising:

a first processor including:

logic for selecting a data-integrity-checking scheme from a specified set of schemes, the logic executed by an application program, logic for communicating the data-integrity-checking scheme including expected address limits, and logic for communicating address limits of the specified portion of the memory window after the transfer completes; and a second processor including:

logic for receiving the scheme from the first processor, receiving the address limits of the specified portion of the address window after the transfer completes and calculating a data-integrity-checking value according to the scheme for the specified portion of the window, when the direct memory access transfer completes, the logic executed by a second program; and logic for communicating the data-integrity-checking value to the first processor.

19. A device according to claim 18 wherein logic for calculating a data-integrity-checking value includes:

logic for initializing a hardware resource for calculating the value and setting a data-integrity-checking value valid flag to false;

logic for calculating a data-integrity-checking value according to the scheme using the resource when the transfer occurs to expected address limits in the window;

logic for setting the data-integrity-checking value valid flag to true and setting actual-transfer address-values, when the hardware resource completes the data integrity-checking value calculation;

logic for reading the data-integrity-checking value valid flag and actual-transfer address-values using the second program when the application program queries the second program for the data-integrity-checking value, the query including the address limits of the specified portion of the memory window; and logic for calculating the data-integrity-checking value over the specified portion of the memory window using the second program when at least one of the following conditions is true: (1) the data-integrity-checking value valid flag is false and (2) actual-transfer address-values do not match the specified portion of the memory window.

* * * * *